(No Model.)
G. A. ELLIOTT.
SPRING WAGON.
No. 252,443.   Patented Jan. 17, 1882.
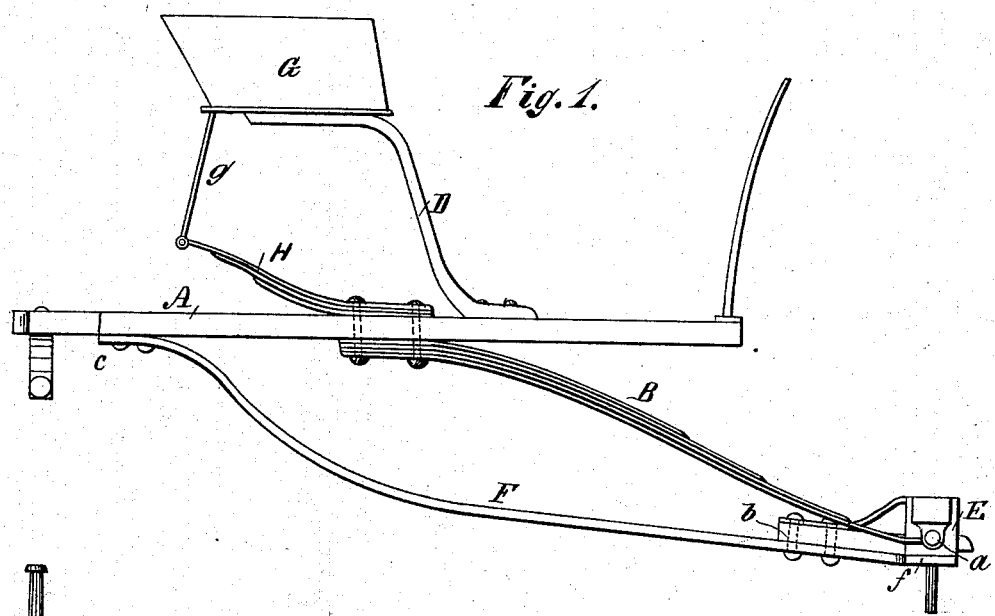
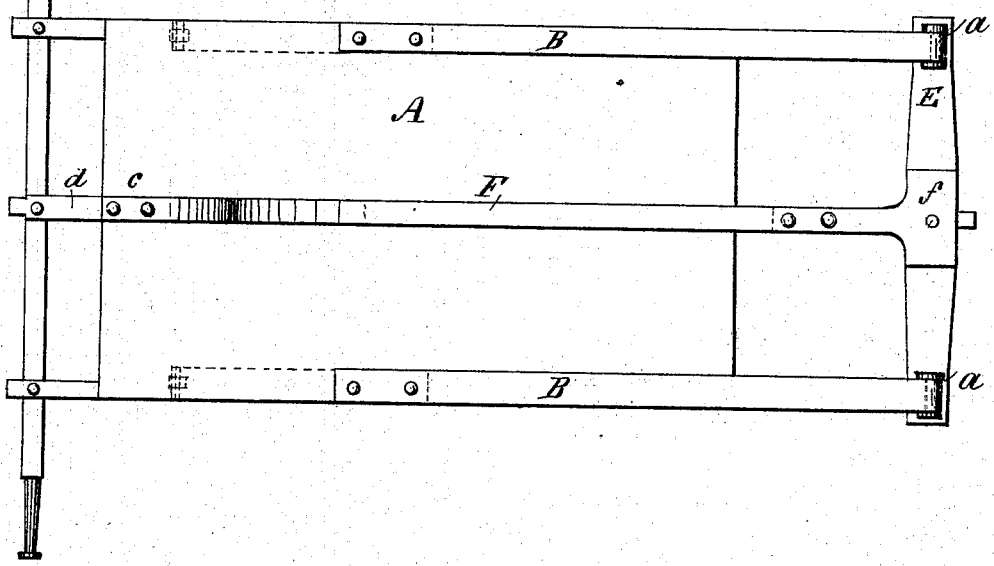
WITNESSES:
Theo. G. Hoster
C. Sedgwick
INVENTOR:
G. A. Elliott
BY Munn & Co
ATTORNEYS.

UNITED STATES PATENT OFFICE.

GEORGE A. ELLIOTT, OF NORTH GROSVENOR DALE, CONNECTICUT.

SPRING-WAGON.

SPECIFICATION forming part of Letters Patent No. 252,443, dated January 17, 1882.

Application filed July 9, 1881. (No model.)

*To all whom it may concern:*

Be it known that I, GEORGE A. ELLIOTT, of North Grosvenor Dale, in the county of Windham and State of Connecticut, have invented a certain new and useful Improvement in Spring-Wagons, of which the following is a specification.

My invention relates to that class of carriages known as skeleton, buckboard, and side-bar carriages or buggies; and it consists, principally, of a novel construction and arrangement of the springs, whereby the buggy is made light, durable, easy riding, and low, and is of simplified and less expansive construction than heretofore.

In the accompanying drawings, Figure 1 is a side elevation of my invention; and Fig. 2 is a bottom view, showing the arrangement of the springs.

Similar letters of reference indicate corresponding parts.

The rear end of the platform A may be attached directly to the rear axle. Upon the under side of the platform, a short distance back of the point where the seat-risers D D are placed upon the platform, are secured the springs B B, which are attached to the forward rocker or bolster, E, by means of the shackles *a a*.

The center spring brace or support, F, is welded to the bottom plate, *f*, of the rocker, and is curved upwardly, and is bolted, as shown at *c*, in the center of the platform or to the short reach *d*, connected to the rear axle. The forward end is also bolted to a short reach, *b*, which passes through the rocker E.

The rear part of the seat G is supported by the braces *g g* upon the ends of the springs H H, which springs are bolted to the platform by the same bolts which secure the springs B B.

The seat-risers D D are of such shape and material as to have sufficient spring to permit the springs H H to act.

By this construction and application of the springs, platform, and seat-risers the jar is removed from the seat and from the forward part of the platform, where the feet rest, and the carriage is thus made very easy riding, besides being very simple, durable, and cheap of construction.

Having thus fully described my invention, I claim as new and desire to secure by Letters Patent—

1. In a spring-wagon, the combination, with the platform A and the middle spring, F, extending from the rear of platform to the bolster, of the side springs, B B, fastened to platform just behind the seat-risers D and at the other end shackled to the under side of the front bolster, as shown and described.

2. The combination, with the bolster E, of the short reach *b* and the spring F, fastened under it and to the platform, as described, to support said bolster in place without connecting it by a reach with the rear axle.

3. The combination of the seat G, supported in front by risers D, with the braces *g* and springs H, arranged as shown and described.

GEORGE ARAD ELLIOTT.

Witnesses:
   A. U. ELLIOTT,
   CHESTER F. BENNETT.